United States Patent
Lv et al.

(10) Patent No.: US 11,237,381 B2
(45) Date of Patent: Feb. 1, 2022

(54) ELECTROWETTING DISPLAY PANEL, ELECTROWETTING DISPLAY APPARATUS, METHOD OF DRIVING ELECTROWETTING DISPLAY PANEL, AND METHOD OF FABRICATING ELECTROWETTING DISPLAY PANEL

(71) Applicants: BEIJING BOE OPTOELECTRONICS TECHNOLOGY CO., LTD., Beijing (CN); BOE Technology Group Co., Ltd., Beijing (CN)

(72) Inventors: Mingyang Lv, Beijing (CN); Yue Li, Beijing (CN); Yanchen Li, Beijing (CN); Jinyu Li, Beijing (CN); Yu Zhao, Beijing (CN); Dawei Feng, Beijing (CN); Wang Guo, Beijing (CN)

(73) Assignees: BEIJING BOE OPTOELECTRONICS TECHNOLOGY CO., LTD., Beijing (CN); BOE Technology Group Co., Ltd., Beijing (CN)

( * ) Notice: Subject to any disclaimer, the term of this patent is extended or adjusted under 35 U.S.C. 154(b) by 313 days.

(21) Appl. No.: 16/464,613

(22) PCT Filed: Jan. 7, 2019

(86) PCT No.: PCT/CN2019/070608
§ 371 (c)(1),
(2) Date: May 28, 2019

(87) PCT Pub. No.: WO2020/007023
PCT Pub. Date: Jan. 9, 2020

(65) Prior Publication Data
US 2020/0333582 A1     Oct. 22, 2020

(30) Foreign Application Priority Data

Jul. 3, 2018 (CN) .......................... 201810718070.9

(51) Int. Cl.
*G02B 26/00* (2006.01)
*G09G 3/34* (2006.01)
(Continued)

(52) U.S. Cl.
CPC .......... *G02B 26/005* (2013.01); *G02F 1/167* (2013.01); *G02F 1/1676* (2019.01);
(Continued)

(58) Field of Classification Search
CPC .............. G02B 26/0875; G02B 26/005; G02B 2207/117; G02B 26/004; G06F 3/013;
(Continued)

(56) References Cited

U.S. PATENT DOCUMENTS

| 9,400,381 B1 | 7/2016 | Novoselov |
| 2012/0146984 A1 | 6/2012 | Cheng et al. |

(Continued)

FOREIGN PATENT DOCUMENTS

| CN | 101666908 A | 3/2010 |
| CN | 102566039 A | 7/2012 |

(Continued)

OTHER PUBLICATIONS

International Search Report & Written Opinion dated Apr. 1, 2019, regarding PCT/CN2019/070608.
(Continued)

*Primary Examiner* — Brandi N Thomas
(74) *Attorney, Agent, or Firm* — Intellectual Valley Law, P.C.

(57) ABSTRACT

An electrowetting display panel includes a plurality of subpixels. Each of the plurality of subpixels having a
(Continued)

subpixel area and an hater-subpixel area. The electrowetting display panel includes a first substrate, including a first insulating layer, a first electrode layer on the first insulating layer, and a first lyophobic layer on a side of the first electrode layer away from the first insulating layer; a second substrate facing the first substrate, including a second electrode layer, and a second lyophobic layer on the second electrode layer; and a plurality of sealing elements between the first substrate and the second substrate to define a plurality of fluid channels, each of the plurality of sealing elements being in the inter-subpixel area. The electrowetting display panel includes a first fluid reservoir and a respective one of the plurality of fluid channels between the first lyophobic layer and the second lyophobic layer.

18 Claims, 8 Drawing Sheets

(51) Int. Cl.
 G02F 1/1685 (2019.01)
 G02F 1/1676 (2019.01)
 G02F 1/167 (2019.01)
(52) U.S. Cl.
 CPC ........... *G02F 1/1685* (2019.01); *G09G 3/348* (2013.01); *G02B 2207/115* (2013.01)
(58) Field of Classification Search
 CPC .............. G02F 1/1368; G02F 1/13338; G02F 1/13312; G02F 1/134363; G02F 1/13439; G02F 1/133345; G02F 1/133512; G02F 1/133514; G02F 1/134336; G02F 1/136286; G02F 1/13629; G02F 1/133553; G02F 1/133305; G02F 1/133354; G02F 1/133516; G02F 1/133555; G02F 1/133603; G02F 1/133784; G02F 1/1341; G02F 1/134372; G02F 1/134381; G02F 1/1345; G02F 1/13456; G02F 1/136209; G02F 1/136213; G02F 1/136227; G02F 1/13624; G02F 1/136254; G02F 1/136277; G02F 1/136295; H01L 27/1225; H01L 29/7869; H01L 27/124; H01L 2924/0002; H01L 27/3262; H01L 27/3272; H01L 31/1136; H01L 2924/00; H01L 27/3276; H01L 2227/323; H01L 27/1218; H01L 31/12; H01L 27/1214; H01L 27/1251; H01L 27/1288; H01L 29/66969; H01L 27/1248; H01L 27/1255; H01L 27/1259; H01L 29/78606; H01L 29/78633; H01L 29/78693; H01L 51/5203; H01L 27/1266; H01L 29/66742; H01L 29/66765; H01L 29/78696; H01L 2251/5315; H01L 27/0248; H01L 27/1222; H01L 27/1262; H01L 27/127; H01L 27/14665; H01L 27/156; H01L 27/3209; H01L 27/3223; H01L 27/3232; H01L 27/3246; H01L 27/3258; H01L 27/3265; H01L 2933/0016; H01L 2933/0025; H01L 2933/0041; H01L 2933/0058; H01L 2933/0066
 See application file for complete search history.

(56) References Cited

U.S. PATENT DOCUMENTS

| | | | |
|---|---|---|---|
| 2013/0128335 A1* | 5/2013 | Parry-Jones | G02B 26/005 359/290 |
| 2013/0141780 A1 | 6/2013 | Jeon et al. | |
| 2013/0222880 A1 | 8/2013 | Nakasuga et al. | |
| 2016/0202534 A1* | 7/2016 | Chen | G02F 1/13454 349/43 |
| 2016/0259160 A1* | 9/2016 | Hsiao | G02B 26/005 |
| 2017/0193955 A1* | 7/2017 | Kim | H01L 29/7869 |

FOREIGN PATENT DOCUMENTS

| | | |
|---|---|---|
| CN | 102645743 A | 8/2012 |
| CN | 103140798 A | 6/2013 |
| CN | 103229098 A | 7/2013 |
| CN | 104330891 A | 2/2015 |
| CN | 105676444 A | 6/2016 |
| CN | 207457903 U | 6/2018 |
| KR | 20070097810 A | 10/2007 |
| KR | 20120076173 A | 7/2012 |

OTHER PUBLICATIONS

Video-speed electronic paper based on electrowetting, Hayes RA et al., Nature, Sep. 25, 2003;425(6956) p. 383-5.
Second Office Action in the Chinese Patent Application No. 201810718070.9, dated Apr. 13, 2020; English translation attached.
First Office Action in the Chinese Patent Application No. 201810718070.9, dated Nov. 29, 2019; English translation attached.

* cited by examiner

```
┌─────────────────────────────────────────┐
│ Turning off the first thin film         │
│ transistor to allow the electrowetting  │
│ fluid to withdraw into the first fluid  │
│ reservoir                               │
└─────────────────────────────────────────┘
                    │
                    ▼
┌─────────────────────────────────────────┐
│ Turning on the first thin film          │
│ transistor to drive the electrowetting  │
│ fluid into the fluid channel            │
└─────────────────────────────────────────┘
```

FIG.5A

```
┌─────────────────────────────────────────┐
│ Turning off both the first thin film    │
│ transistor and the second thin film     │
│ transistor to allow the electrowetting  │
│ fluid to withdraw into the first fluid  │
│ reservoir                               │
└─────────────────────────────────────────┘
                    │
                    ▼
┌─────────────────────────────────────────┐
│ Turning on one or a combination of the  │
│ first thin film transistor and the      │
│ second thin film transistor to drive    │
│ the electrowetting fluid into the fluid │
│ channel                                 │
└─────────────────────────────────────────┘
```

FIG.5B

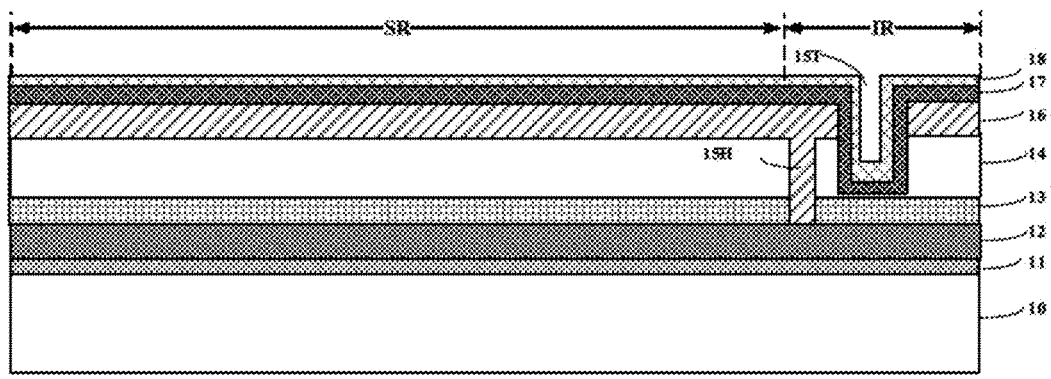

FIG. 6A

Turning off both the first thin film transistor and the second thin film transistor to allow the electrowetting fluid to withdraw into the first fluid reservoir and the second fluid reservoir Turning on one or a combination of the first thin film transistor and the second thin film transistor to drive the electrowetting fluid into the fluid channel

ELECTROWETTING DISPLAY PANEL, ELECTROWETTING DISPLAY APPARATUS, METHOD OF DRIVING ELECTROWETTING DISPLAY PANEL, AND METHOD OF FABRICATING ELECTROWETTING DISPLAY PANEL

CROSS-REFERENCE TO RELATED APPLICATION

This application is a national stage application under 35 U.S.C. § 371 of International Application No. PCT/CN2019/070608, filed Jan. 7, 2019, which claims priority to Chinese Patent Application No. 201810718070.9, filed Jul. 3, 2018, the contents of which are incorporated by reference in the entirety.

TECHNICAL FIELD

The present invention relates to display technology, more particularly, to an electrowetting display panel, an electrowetting display apparatus, a method of driving an electrowetting display panel, and a method of fabricating ail electrowetting display panel.

BACKGROUND

Nowadays, the display technologies used in an e-book reader or an e-paper attract more and more attentions. There are two kinds of technologies frequently used in an e-paper. The first technology uses the principle of electrophoresis, for example, the electric field drives capsules in an e-paper to move to display images, by driving the charged particles in the capsules to move. The second technology uses the total reflection on the liquid crystal layer, cooperating with the color film of an e-paper, to display color images.

SUMMARY

In one aspect, the present invention provides an electrowetting display panel comprising a plurality of subpixels, each of the plurality of subpixels having a subpixel area and an inter-subpixel area, wherein the electrowetting display panel comprises a first substrate, comprising a first insulating layer, a first electrode layer on the first insulating layer, and a first lyophobic layer on a side of the first electrode layer away from the first insulating layer, a second substrate facing the first substrate, comprising a second electrode layer, and a second lyophobic layer on the second electrode layer; and a plurality of sealing elements between the first substrate and the second substrate to define a plurality of fluid channels, each of the plurality of sealing elements being in the inter-subpixel area; wherein the electrowetting display panel in a respective one of the plurality of subpixels comprises a first fluid reservoir in the first substrate and in the inter-subpixel area for storing the electrowetting fluid; and a respective one of the plurality of fluid channels between the first lyophobic layer and the second lyophobic layer connecting with the first fluid reservoir.

Optionally, the electrowetting display panel in a respective one of the plurality of subpixels further comprises a first thin film transistor configured to provide a first driving signal to the first electrode layer; and a second thin film transistor configured to provide a second driving signal to the second electrode layer.

Optionally, the first substrate further comprises a first via extending through the first insulating layer; and a conductive layer on a side of the first insulating layer away from the first electrode layer, being connected to the first electrode layer through the first via.

Optionally, the first substrate further comprises a first buffer layer between the conductive layer and the first insulating layer; and the first via extends through the first insulating layer and the first buffer layer.

Optionally, the second substrate further comprises a light shielding layer in the inter-subpixel area; and an orthographic projection of the light shielding layer on the first substrate covers the first fluid reservoir.

Optionally, the light shielding layer connects the second thin film transistor to the second electrode layer in a respective one of the plurality of subpixels.

Optionally, the light shielding layer is in direct contact with the second electrode layer.

Optionally, the second substrate further comprises a second insulating layer on a side of the second electrode layer away from the second lyophobic layer; and a second via extending through the second insulating layer; wherein the second electrode layer is connected to the light shielding layer through the second via.

Optionally, the electrowetting display panel in the respective one of the plurality of subpixels comprises a second fluid reservoir in the second substrate and in the inter-subpixel area for storing the electrowetting fluid, and in fluid communication with the respective one of the plurality of fluid channels.

Optionally, the first fluid reservoir and the second fluid reservoir are disposed on two opposite sides of the respective one of the plurality of subpixels in a substantially symmetrical fashion with respect to the respective one of the plurality of fluid channels.

Optionally, the first fluid reservoir and the second fluid reservoir are disposed in a substantially asymmetrical fashion with respect to the respective one of the plurality of fluid channels.

Optionally, the second substrate further comprises a second buffer layer on a side of the second insulating layer away from the second electrode layer; and the second via extends through the second insulating layer and the second buffer layer.

Optionally, the light shielding layer is in direct contact with the second buffer layer.

Optionally, the electrowetting display panel further comprises an electrowetting fluid in one or a combination of the respective one of the plurality of fluid channels and the first fluid reservoir; wherein the electrowetting fluid in at least two of the plurality of subpixels has different colors.

Optionally, the first fluid reservoir extends into the first substrate by a depth in a range of approximately 40 μm to approximately 80 μm, and has a lateral width in a range of approximately 15 μm to approximately 30 μm.

Optionally, the first lyophobic layer covers the first electrode layer; and the second lyophobic layer covers the second electrode layer.

Optionally, the first substrate further comprises a first dielectric layer between the first electrode layer and the first lyophobic layer, and is covered by the first lyophobic layer; and the second substrate further comprises a second dielectric layer between the second electrode layer and the second lyophobic layer, and is covered by the second lyophobic layer.

Optionally, the second electrode layer is a transparent electrode layer; and the second lyophobic layer is a transparent lyophobic layer.

In another aspect, the present invention provides an electrowetting display apparatus, comprising the electrowetting display panel described herein or fabricated by a method described herein, and one or more integrated circuits connected to the electrowetting display panel.

In another aspect, the present invention provides a method of driving, an electrowetting display panel having a subpixel area and an inter-subpixel area, the electrowetting display panel comprising a plurality of subpixels; wherein the electrowetting display panel comprises a first substrate, comprising a first insulating layer, a first electrode layer on the first insulating layer, and a first lyophobic layer on a side of the first electrode layer away from the first insulating layer; a second substrate facing the first substrate, comprising a second electrode layer, and a second lyophobic layer on the second electrode layer; and a plurality of sealing elements between the first substrate and the second substrate to define a plurality of fluid channels, each of the plurality of sealing elements being in the inter-subpixel area; wherein the electrowetting display panel in a respective one of the plurality of subpixels comprises a first fluid reservoir in the first substrate and in the inter-subpixel area for storing the electrowetting fluid; a respective one of the plurality of fluid channels between the first lyophobic layer and the second lyophobic layer connecting with the first fluid reservoir; a first thin film transistor configured to provide a first driving signal to the first electrode layer; and a second thin film transistor configured to provide a second driving signal to the second electrode layer; the method comprises turning off both the first thin film transistor and the second thin film transistor to allow the electrowetting fluid to withdraw into the first fluid reservoir; and turning on one or a combination of the first thin film transistor and the second thin film transistor to drive the electrowetting fluid into the fluid channel.

In another aspect, the present invention provides a method of fabricating an electrowetting display panel comprising a plurality of subpixels, each of the plurality of subpixels having a subpixel area and an inter-subpixel area, wherein the method comprises forming a first substrate comprising a first insulating layer, a first electrode layer on the first insulating layer, a first lyophobic layer on a side of the first electrode layer away from the first insulating layer, and a first fluid reservoir in the first substrate and in the inter-subpixel area for storing the electrowetting fluid in a respective one of the plurality of subpixels; forming a second substrate facing the first substrate, comprising a second electrode layer, and a second lyophobic layer on the second electrode layer; forming a plurality of sealing elements between the first substrate and the second substrate to define a plurality of fluid channels, each of the plurality of sealing elements being in the inter-subpixel area; and assembling the first substrate and the second substrate together thereby forming a respective one of the plurality of fluid channels between the first lyophobic layer and the second lyophobic layer connecting with the first fluid reservoir.

BRIEF DESCRIPTION OF THE FIGURES

The following drawings are merely examples for illustrative purposes according to various disclosed embodiments and are not intended to limit the scope of the present invention.

FIG. 5A is a flow chat illustrating a method of driving an electrowetting display panel in some embodiments according to the present disclosure.

FIG. 5B is a flow chat illustrating a method of driving an electrowetting display panel in some embodiments according to the present disclosure.

FIG. 6A is a cross-sectional view of a first substrate in some embodiments according to the present disclosure.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

It is difficult for an e-paper to display color images using principle of electrophoresis. The time period spent in switching between different colors is long, and the fabrication cost of such e-paper is high. Also, for the e-paper using the total reflection of the liquid crystal layer having color film, the incident light should transmit through the color film twice, which will greatly reduce the reflectivity of light.

Accordingly, the present disclosure provides, inter alia, an electrowetting display panel, an electrowetting display apparatus, a method of driving an electrowetting display panel, and a method of fabricating an electrowetting display panel that substantially obviate one or more of the problems due to limitations and disadvantages of the related art. In one aspect, the present disclosure provides an electrowetting display panel having a subpixel area and an inter-subpixel area. The electrowetting display panel having a subpixel area and an inter-subpixel area includes a plurality of subpixels. Optionally, the electrowetting display panel includes a first substrate, including a first insulating layer, a first electrode layer on the first insulating layer, and a first lyophobic layer on a side of the first electrode layer away from the first insulating layer; a second substrate facing the first substrate, including a second electrode layer, and a second lyophobic layer on the second electrode layer; and a plurality of sealing elements between the first substrate and the second substrate to define a plurality of fluid channels, each of the plurality of sealing elements being in the inter-subpixel area. Optionally, the electrowetting display panel in a respective one of the plurality of subpixels includes a first fluid reservoir in the first substrate and in the inter-subpixel area for storing the electrowetting fluid; and a respective one of the plurality of fluid channels between the first lyophobic layer and the second lyophobic layer connecting with the first fluid. Optionally, the electrowetting display panel in the respective one of the plurality of subpixels further includes a first thin film transistor configured to provide a first driving signal to the first electrode layer; and a second thin film transistor configured to provide a second driving signal to the second electrode layer.

Figure 1A:
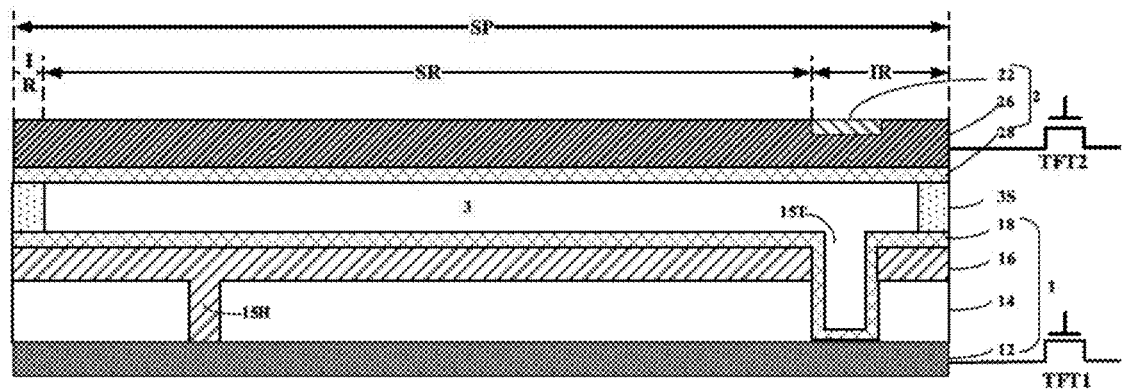
FIG. 1A is a cross-sectional view of an electrowetting display panel in some embodiments according to the present disclosure.

FIG. 1A is a cross-sectional view of an electrowetting display panel in some embodiments according to the present disclosure. The cross-sectional view of an electrowetting display panel of FIG. 1A is along a line AB in FIG. 4 which is a plan view of ash electrowetting display panel in a turn-off state in some embodiments according to the present disclosure. Referring to FIG. 1A, in some embodiments, an electrowetting display panel having a subpixel area and an inter-subpixel area includes a plurality of subpixels SP. The display electrowetting panel includes a first substrate 1, a second substrate 2 facing each other. Optionally, the first substrate 1 includes a first insulating layer 14; a first electrode layer 16 on the first insulating layer 14; and a first lyophobic layer 18 on a side of the first electrode layer 16 away from the first insulating layer 14. Optionally, the second substrate 2 includes a second electrode layer 26; and a second lyophobic layer 28 on the second electrode layer 26. Optionally, the first insulating layer 14 is made of insulating materials, such as resin.

As used herein, the term "subpixel area" refers to a light emission area of a subpixel of the plurality of subpixels, such as an area corresponding to a fluid channel in an electrowetting display panel. As used herein, the term "inter-subpixel area" refers to a light blocking area in a subpixel of the plurality of subpixels, such as an area corresponding to a fluid reservoir.

As defined herein, the term "lyophobic" refers to the repellant nature one material has for a solution. Optionally, the term lyophobic refers to a condition where a contact angle of about 40° or more (e.g., 50° or more, 60° or more, 70° or more, and 80° or more) is measured when a solution or a solvent for dissolving a compound is placed on a surface having the lyophobic material when no electric field is applied to the surface. Optionally, the term lyophobic refers to a material having a low affinity to a solution, for example, a surface free energy of 30 mJ/m$^2$ or less when no electric field is applied. In one example, lyophobic can be hydrophobic with respect to a water-based solution. In another example, lyophobic can be hydrophilic with respect to an oil-based solution. In another example, lyophobic can be oleophobic with respect to an oil-based solution.

In some embodiments, the electrowetting display panel in a respective one of the plurality of subpixels SP includes a fluid channel 3 formed between the first lyophobic layer 18 and the second lyophobic layer 28 for allowing an electrowetting fluid to move between the first lyophobic layer 18 and the second lyophobic layer 28; a first fluid reservoir 15T formed in the first substrate 1 in the inter-subpixel area IR for storing the electrowetting fluid, and in fluid communication with the fluid channel; a first thin film transistor TFT1 configured to provide a first driving signal to the first electrode layer 16; and a second thin film transistor TFT2 configured to provide a second driving signal to the second electrode layer 26. Optionally, the electrowetting fluid is in one or a combination of the fluid channel 3 and the first fluid reservoir 15T. Optionally, the electrowetting fluid in at least two of the plurality of subpixels SP has different colors.

In some embodiments, the first fluid reservoir 15T extends through the first insulating layer 14 and the first electrode layer 16. Optionally, an area where the first fluid reservoir 15T extends through in the first insulating layer 14 corresponds to the inter-subpixel area IR. In one example, the area where the first fluid reservoir 15T extends through in the first insulating layer 14 is on an end of the first insulating layer 14. In another example, the area where the first fluid reservoir 15T extends through in the first insulating layer 14 is in the middle of the first insulating layer 14. Optionally, the area where the first fluid reservoir 15T extends through in the first insulating layer 14 corresponds to the subpixel area SR.

Optionally, various appropriate shapes may be used to form the cross-sectional view of the first fluid reservoir 15T along the line AB of the plan view of the electrowetting display panel in FIG. 4. The suitable shapes include, but not limited to, rectangular.

Optionally, the first fluid reservoir 15T extends into the first substrate by a depth in a range of approximately 40 μm to approximately 80 μm, e.g. approximately 40 μm to approximately 50 μm, approximately 50 μm to approximately 60 μm, approximately 60 μm to approximately 70 μm, and approximately 70 μm to approximately 80 μm. Optionally, the first fluid reservoir 15T has a lateral width in a range of approximately 15 μm to approximately 30 μm, e.g. approximately 15 μm to approximately 20 μm, approximately 20 μm to approximately 25 μm, and approximately 25 μm to approximately 30 μm. Optionally, the thickness of the first insulating layer 14 is no less than the depth of the first fluid reservoir 15T. For example, the thickness of the first insulating layer 14 equals to the depth of the first fluid reservoir 15T.

In some embodiments, the amount of electrowetting fluid needed in the electrowetting display panel can be calculated based on the thickness of the electrowetting display panel, and the volume of the first fluid reservoir 15T can be calculated based on the amount of electrowetting fluid needed. Since the depth of the first fluid reservoir 15T is determined by the thickness of the first insulating layer 14, the shape of the first fluid reservoir 15T can also be determined based on the thickness of the first insulating layer 14 and amount of electrowetting fluid needed.

Figure 1B:
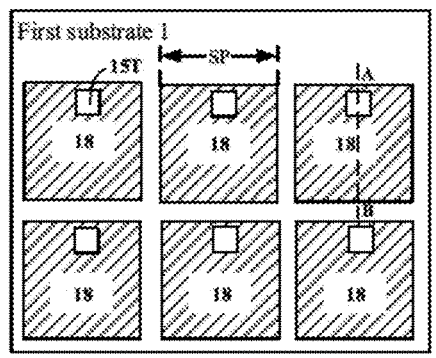
FIG. 1B is a plan view of a first substrate in some embodiments according to the present disclosure.

FIG. 1B is a plan view of a first substrate in some embodiments according to the present disclosure. The plan view of the first substrate 1 is viewed along, a direction from the second substrate 2 to the first substrate 1. The first lyophobic layer 18 covers a block of the first electrode layer 16 in the respective one of the plurality of subpixels SP. Optionally, two adjacent protrusions formed by the first insulating layer, first electrode layer and the first lyophobic layer in the respective subpixels of the plurality of subpixels SP are spaced apart and insulated from each other. Optionally, each individual one of the plurality of subpixels SP includes a first fluid reservoir 15T.

Figure 1C:
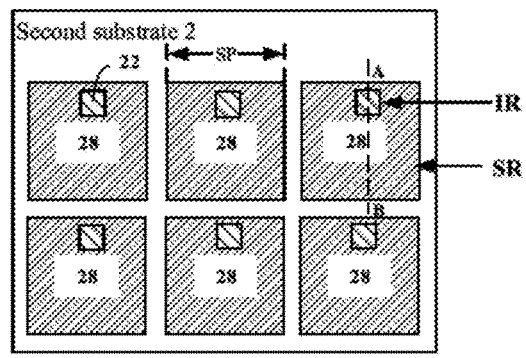
FIG. 1C is a plan view of a second substrate in some embodiments according to the present disclosure.

FIG. 1C is a plan view of a second substrate in some embodiments according to the present disclosure. The plan view of the second substrate 2 is viewed along a direction from the first substrate 1 to the second substrate 2. The second lyophobic layer 28 covers a block of the second electrode layer 26 in the respective one of the plurality of subpixels SP. Optionally, two adjacent protrusion formed by the second electrode layer, and the second lyophobic layer in the respective subpixels of the plurality of subpixels SP are spaced apart and insulated from each other. Optionally, each individual one of the plurality of subpixels SP includes a light shielding layer 22. In one example, the light shielding layer 22 is in an inter-subpixel area IR in a respective one of the plurality of subpixels SP. In another example, the light shielding layer 22 is substantially outside the subpixel area SR in a respective one of the plurality of subpixels SP.

For example, referring to both FIG. 1B and FIG. 1C, an orthographic projection of the light shielding layer 22 on the first substrate 1 covers the first fluid reservoir 15T in a respective one of the plurality of subpixels SP.

Referring to FIG. 1A, in some embodiment, the first electrode layer 16 is disposed on the first insulating layer 14; and the first lyophobic layer 18 is disposed on a side of the first electrode layer 16 away from the first insulating layer 14. Optionally, an orthographic projection of the first lyophobic layer 18 on the first insulating layer 14 covers the first insulating layer 14. Optionally, the first lyophobic layer 18 extends from a region outside the first fluid reservoir 15T into a region inside the first fluid reservoir 15T. Optionally, the first lyophobic layer 18 covers the lateral walls and the bottom wall of the first fluid reservoir 15T.

In some embodiments, there is no affinity between the first lyophobic layer 18 and the electrowetting fluid, and the first lyophobic layer 18 repels the electrowetting fluid. Optionally, the first lyophobic layer 18 include fluorinated transparent materials. Optionally, the first lyophobic layer 18 is relatively thin, for example, the thickness of the first lyophobic layer 18 is approximately 100 nm.

In some embodiments, the first electrode layer 16 is between the first insulating layer 14 and the first lyophobic layer 18. In one example, the orthographic projection of the first lyophobic layer 18 on a first lyophobic layer 18 overlaps with the orthographic projection of the first electrode layer 16 on the first lyophobic layer 18. In another example, the orthographic projection of the first electrode layer 16 on the first lyophobic layer 18 does not cover the first fluid reservoir 15T. For example, the first electrode layer 16 is present in a region outside the first fluid reservoir 15T and is absent in a region inside the first fluid reservoir 15T.

Various appropriate materials may be used for making the first electrode layer 16. Examples of materials suitable for making the first electrode layer 16 include, but not limited to, aluminum (Al). For example, the first electrode layer 16 is made of aluminum (Al), the first electrode layer 16 can also be used as a reflection layer configure to reflect light back to the electrowetting fluid again, which may enhance the reflectivity of the electrowetting display panel.

In some embodiments, the first substrate 1 further includes a conductive layer 12 on a side of the first insulating layer 14 away from the first electrode layer 16. Optionally, the conductive layer 12 connects the first thin film transistor TFT1 to the first electrode layer 16 in a respective one of the plurality of subpixels SP. Optionally, the conductive layer 12 and the first electrode layer 16 connects to each other in parallel to decrease the resistance in the circuit.

Various appropriate materials may be used for making the conductive layer 12. Examples of materials suitable for making the conductive layer 12 include, but not limited to, Al—Mo alloy.

In some embodiments, the electrowetting display panel in a respective one of the plurality of subpixels further includes a first via 15H extending through the first insulating layer 14. Optionally, the first electrode layer 16 is connected to the conductive layer 12 through the first via 15H.

Various appropriate materials, may be used to filing in the first via 15H to connect the first electrode layer 16 to the conductive layer 12. Examples of materials suitable to be filed in the first via 15H include, but not limited to. aluminum (Al).

In some embodiments, the second substrate 2 includes the second electrode layer 26; and the second lyophobic layer 28 on the second electrode layer 26, and a light shielding layer 22 in the inter-subpixel area in each individual one of the plurality of subpixels SP.

In some embodiments, the second substrate 2 is disposed opposite to the lint substrate 1. Specifically, the second lyophobic layer 28 is disposed opposite to the first lyophobic layer 18.

In some embodiments, the second electrode layer 26 is connected to the second thin film transistor TFT2 in a respective one of the plurality of subpixels SP. Optionally, the light shielding layer 22 connects the second thin film transistor TFT2 to the second electrode layer 26. Optionally, the second electrode layer 26 is a transparent electrode layer.

Various appropriate materials may be used for making the second electrode layer 26. Examples of materials appropriate for making the second electrode layer 26 include, but not limited to, transparent materials. For example, the second electrode layer 26 is made of indium tin oxide (ITO).

Figure 1D:
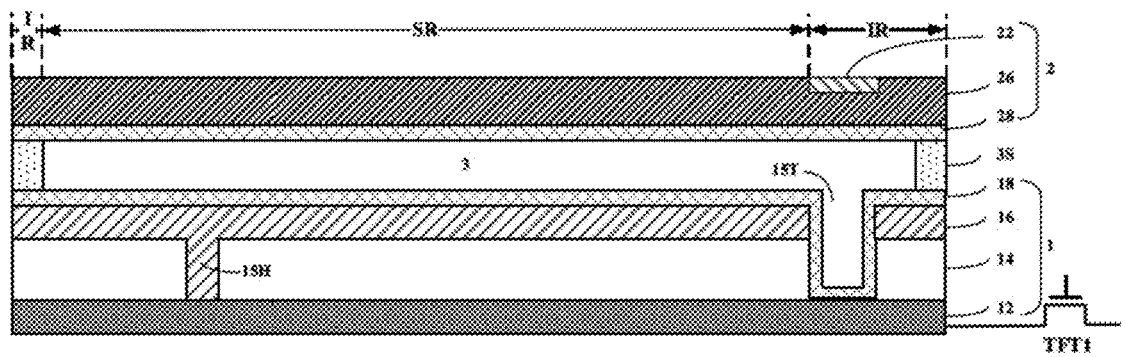
FIG. 1D is a cross-sectional view of an electrowetting display panel in some embodiments according to the present disclosure.

FIG. 1D is a cross-sectional view of an electrowetting display panel in some embodiments according to the present disclosure. In some embodiments, a first thin film transistor TFT1 is connected to the first electrode layer 16 of the first substrate 1, no thin film transistor is connected to the second electrode layer 26 of the second substrate 2.

Referring to FIG. 1, in some embodiments, an orthographic projection of the second lyophobic layer 28 on the first substrate 1 overlaps with an orthographic projection of the second electrode layer 26. Optionally, there is no affinity between the second lyophobic layer 28 and the electrowetting fluid, and the second lyophobic layer 28 repels the electrowetting fluid. Optionally, the second lyophobic layer is a transparent lyophobic layer. Optionally, the second lyophobic layer 28 includes fluorinated transparent materials. Optionally, the second lyophobic layer 28 is relatively thin, for example, the thickness of the second lyophobic layer 28 is approximately 100 nm.

In some embodiments, the location of the light shielding layer 22 corresponds to the location of the first fluid reservoir 15T in a respective of the subpixels. Optionally, an orthographic projection of the light shielding layer 22 on the first substrate 1 covers the first fluid reservoir 15T, and is substantially outside a region corresponding to the fluid channel. Optionally, the light shielding layer 22 only blocks light transmitting through the electrowetting fluid in the first fluid reservoir 15T, while the, light shielding layer 22 does not block light transmitting through the electrowetting fluid in the region of fluid channel corresponding to the subpixel area SR in a respective one of the plurality of subpixels SP. Optionally, the light shielding layer 22 is made of carbon.

Optionally, the light shielding layer 22 is in direct contact with the second electrode layer 26.

In some embodiments, the electrowetting display panel in a respective one of the plurality of subpixels includes the fluid channel 3 formed between the first lyophobic layer 18 and the second lyophobic layer 28 for allowing an electrowetting fluid to move between the first lyophobic layer 18 and the second .lyophobic layer 28. Optionally, the fluid channel 3 is connected to the first fluid reservoir 15T, and the fluid channel 3 is in fluid communication with the first fluid reservoir 15T.

Various appropriate heights of the fluid channel 3 may be adopted based on different structures of the electrowetting display panels. For example, the height of the fluid channel 3 is 4 μm. Optionally, different subpixels of the plurality of subpixels SP can have different heights of fluid channels.

Optionally, the fluid channel 3 can be sealed by sealing elements 3S. Optionally, the sealing elements 3S is made of resin. In one example, the sealing elements 3S are disposed on one or a combination of the first substrate 1 and the second substrate 2.

Figure 2A:
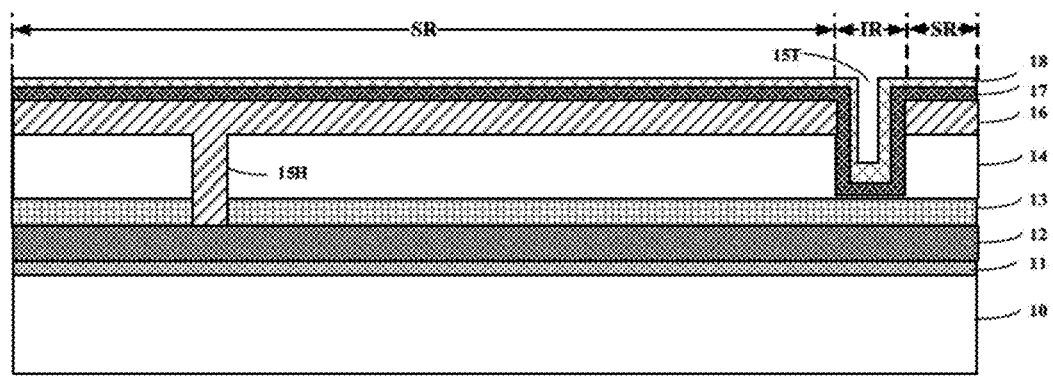
FIG. 2A is a cross-sectional view of a first substrate in some embodiments according to the present disclosure.

FIG. 2A is a cross-sectional view of a first substrate in some embodiments according to the present disclosure. The cross-sectional view of the first substrate is along a direction of line AB in the FIG. 1B. Referring to FIG. 2A, in some embodiments, the first substrate further includes a first base substrate 10, and a first gate insulation layer 11 between the first base substrate 10 and the conductive layer 12. Optionally, the first base substrate 10 is made of glass. Optionally, the first gate insulation layer 11 is made of $SiN_x$.

In some embodiments, the first substrate further includes a first buffer layer 13 between the conductive layer 12 and the first insulating layer 14. And the first via 15H extends through the first insulating layer 14 and the first buffer layer 13. Optionally, the first buffer layer 13 is used for flattening a side of the first insulating layer 14 facing the first base substrate 10. which may further make a side of the first insulating layer 14 away from the first base substrate 10 flatter. Optionally, the first buffer layer 13 is made of $SiN_x$.

In some embodiments, the first substrate further includes a first dielectric layer 17 between the first electrode layer 16 and the first lyophobic layer 18. And an orthographic projection of the first dielectric layer 17 on the first base substrate 10 is covered by an orthographic projection of first lyophobic layer 18 on the first base substrate. Optionally, the orthographic projection of the first dielectric layer 17 on the first base substrate 10 covers the first fluid reservoir 15T. For example, the first dielectric layer 17 is present in a region outside the first fluid reservoir 15T and is also present in a region inside the first fluid reservoir 15T. The first dielectric layer 17 extends from the region outside the first fluid reservoir 15T into the region inside the first fluid reservoir 15T. Optionally, the first dielectric layer 17 covers the lateral walls and the bottom wall of the first fluid reservoir 15T. In one example, the orthographic projection of the first electrode layer 16 on the first base substrate 10 does not overlap with the first fluid reservoir 15T. For example, the first electrode layer 16 is present in a region outside the first fluid reservoir 15T and is absent in a region inside the first fluid reservoir 15T. Optionally, a portion of the first dielectric layer 17 in the region outside the first fluid reservoir 15T is disposed between the first electrode layer 16 and the first lyophobic layer 18. Optionally, a portion of the first dielectric layer 17 in the region inside the first fluid reservoir 15T is disposed between the first fluid reservoir 15T and the first insulating layer 14, e.g., between the first lyophobic layer 18 and the first insulating layer 14.

Optionally, the first dielectric layer 17 is made of $SiO_2$. Optionally, the thickness of the first dielectric layer 17 is approximately 0.25 μm. Optionally, the first dielectric layer 17 may prevent currents from flowing through the electrowetting fluid, which allows the electrowetting display panel to work under a relatively high voltage.

In some embodiments, in a first substrate in a respective one of the plurality of subpixels, the first gate insulation layer 11 is disposed on the first base substrate 10. The conductive layer 12 is disposed on a side of the first gating insulating layer 11 away from the first base substrate 10. The first buffer layer 13 is disposed on a side of the conductive layer 12 away from the first base substrate 10. The first insulating layer 14 is disposed on a side of the first buffer layer 13 away from the first base substrate 10. The first electrode layer 16 is disposed on a side of the first insulating layer 14 away from the first base substrate 10. The first dielectric layer 17 is disposed on a side of the first electrode layer 16 away from the first base substrate 10. The first lyophobic layer 18 is disposed on a side of the first dielectric layer 17 away from the first base substrate 10. The first fluid reservoir 15T extends through the first electrode layer 16 and extends into the first insulating layer 14. The first via 15H extends through the first insulating layer 14 and the first buffer layer 13.

Figure 2B:
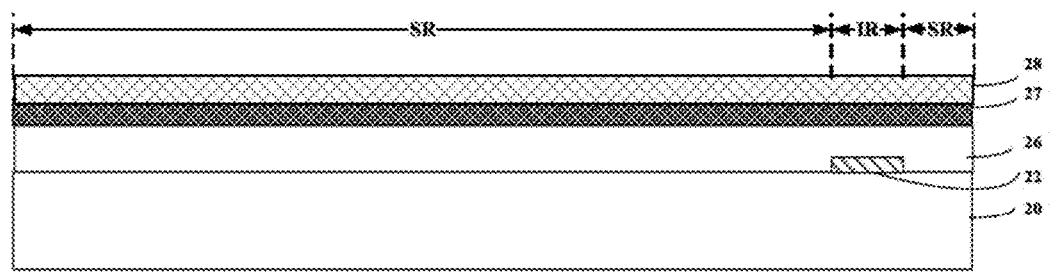
FIG. 2B is a cross-sectional view of a second substrate in some embodiments according to the present disclosure.

FIG. 2B is a cross-sectional view of a second substrate in some embodiments according to the present disclosure. The cross-sectional view of the second substrate is along a direction of line AB in the FIG. 1C. The second substrate further include a second base substrate 20. Optionally, the second base substrate 20 is made of glass.

In some embodiments, the second substrate further includes a second dielectric layer 27 between the second electrode layer 26 and the second lyophobic layer 28. And an orthographic projection of the second dielectric layer 27 on the second base substrate 20 is covered by an orthogaphic projection of the second lyophobic layer 28 of the second base substrate 20. Optionally, the second dielectric layer 27 is made of $SiO_2$. Optionally, the thickness of the second dielectric layer 27 is approximately 0.25 μm.

Figure 3A:
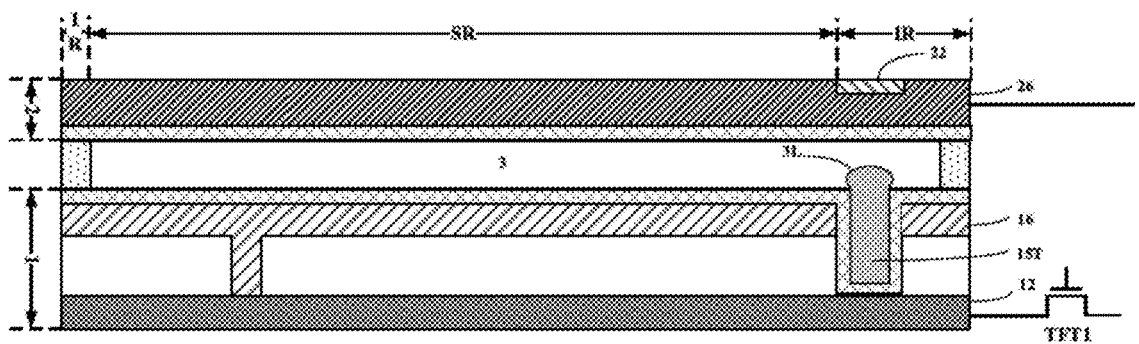
FIG. 3A is a cross-sectional view of an electrowetting display panel in a turn-off state in some embodiments according to the present disclosure.

FIG. 3A is a cross-sectional view of an electrowetting display panel in a turn-off state in some embodiments according to the present disclosure. Referring to FIG. 3A, in some embodiment, the electrowetting display panel in a respective one of the plurality of the subpixels SP further includes a first thin film transistor TFT1 configured to provide a first driving signal to the first electrode layer 16. Optionally, the conductive layer 12 connects the first thin film transistor TFT1 to the first electrode layer 16. Optionally, the first thin film transistor TFT1 is made of materials with a higher mobility. For example, the first thin film transistor TFT1 is made of a-Si.

In some embodiments, the first substrate 1 and the second substrate 2 are assembled together into a cell. The electrowetting fluid 3L is in one or a combination of the first fluid reservoir 15T and the fluid channel 3. Optionally, the electrowetting fluid 3L includes dodecane oil liquid as a solvent and a color pigment as a solute. For example, the electrowetting fluid 3L is fluid in color.

In a turn-off state of a respective one of the plurality of subpixels, the first thin film transistor TFT1 is turned off. Referring to FIG. 3A, the electrowetting fluid 3L is held in the first fluid reservoir 15T by the surface tension of the electrowetting fluid 3L. No electrowetting fluid 3L spreads into the fluid channel 3. At the same time, the orthographic projection of the light shielding layer 22 on the first substrate 1 covers the first fluid reservoir 15T. For example, the light transmitting through the first fluid reservoir 15T is blocked by the light shielding layer 22. No color is displayed by the respective one of the plurality of subpixels SP.

Figure 3B:
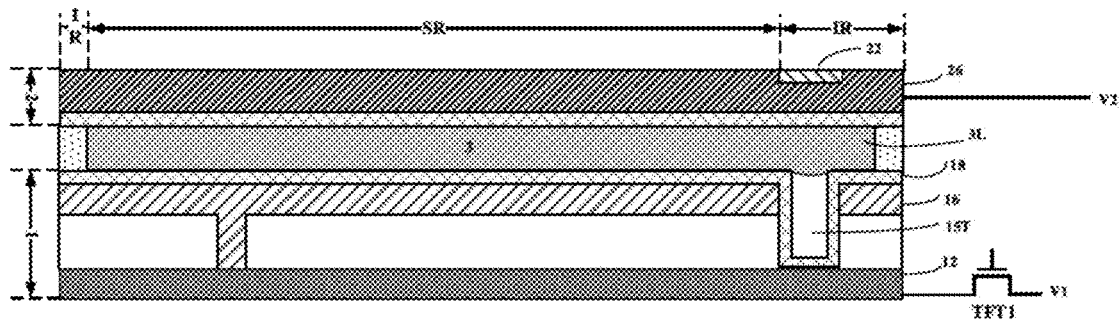
FIG. 3B is a cross-sectional view of an electrowetting display panel in a turn-on state in some embodiments according to the present disclosure.

FIG. 3B is a cross-sectional view of an electrowetting display panel in a turn-on state in some embodiments according to the present disclosure. Referring to FIG. 3B, in a turn-on state of a respective one of the plurality of subpixels, the first thin film transistor TFT1 is turned on. The first thin film transistor TFT1 provides a first driving signal V1 to the first electrode layer 16. The second electrode layer 26 receives a second driving signal V2. An electric field is formed between the first electrode layer 16 and the second electrode layer 26. Under the influence of the electric field, electric charges (e.g. negative charges) are respectively accumulated on a side of the first lyophobic layer 18 facing the second substrate 2 and a surface of the electrowetting fluid 3L, the accumulation of the electric charges facilitates the electrowetting fluid 3L to spread out on the fluid channel 3. In order to keep in a low energy state, the electrowetting fluid 3L tends to spread along the side of the first lyophobic layer 18 facing the second substrate 2, which may lead to the display of color in the respective one of the plurality of subpixels SP. For example, in the turn-on state, the electrowetting fluid 3L is in the fluid channel 3, and is not in the first fluid reservoir 15T.

Figure 3C:
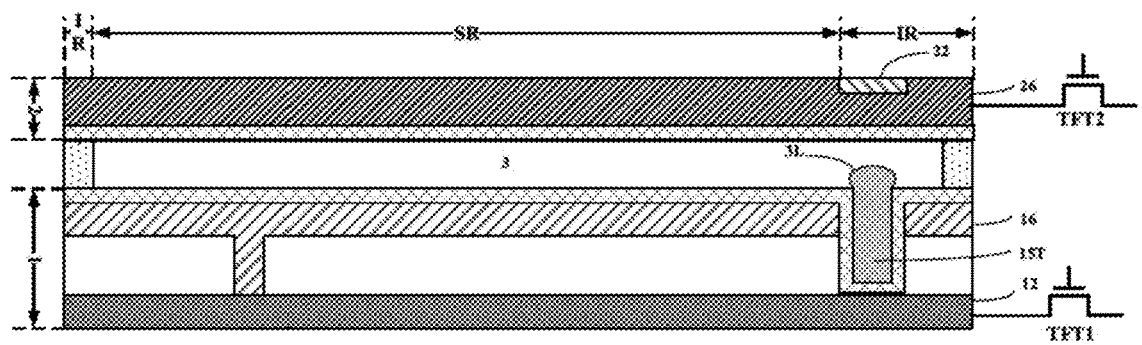
FIG. 3C is a cross-sectional view of an electrowetting display panel in a turn-off state in some embodiments according to the present disclosure.

FIG. 3C is a cross-sectional view of an electrowetting display panel in a turn-off state in some embodiments according to the present disclosure. Referring to FIG. 3C, in some embodiment, the electrowetting display panel in a respective one of the plurality of the subpixels SP further includes a second thin film transistor TFT2 configured to provide a second driving signal V2 to the second electrode layer 26.

In a turn-off state of a respective one of the plurality of subpixels, the first thin film transistor TFT1 and the second thin film transistor TFT2 are turned off. The electrowetting fluid 3L is held in the first fluid reservoir 15T by the surface tension of the electrowetting fluid. No electrowetting fluid 3L spreads into the fluid channel 3. At the same time, the orthographic projection of the light shielding layer 22 on the first substrate 1 covers the first fluid reservoir 15T. For example, the light transmitting through the first fluid reservoir 15T is blocked by the light shielding layer 22. No color is displayed by the respective one of the plurality of subpixels SP.

Figure 3D:
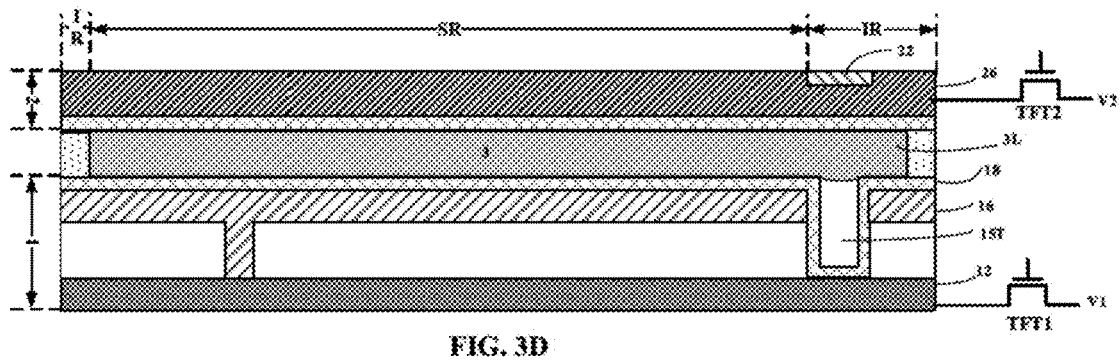
FIG. 3D is a cross-sectional view of an electrowetting display panel in a turn-on state in some embodiments according to the present disclosure.

FIG. 3D is a cross-sectional view of an electrowetting display panel in a turn-on state in some embodiments according to the present disclosure. Referring to FIG. 3D, in a turn-on state of a respective one of the plurality of subpixels, in one example, the first thin film transistor TFT1 is turned on. The first thin film transistor TFT1 provides a first driving signal V1 to the first electrode layer 16. in another example, the second thin film transistor TFT2 is turned on. The second thin film transistor TFT2 provide a second driving signal V2 to the second electrode layer 26. An electric field is formed between the first electrode layer 16 and the second electrode layer 26. Under the influence of the electric field, electric charges (e.g. negative charges) are respectively accumulated on a side of the first lyophobic layer 18 facing the second substrate 2 and a surface of the electrowetting fluid 3L in the first fluid reservoir 15T, the accumulation of the electric charges facilitates the electrowetting fluid 3L to spread out on the fluid channel 3. In order to stay in a low energy state, the electrowetting fluid 3L tends to spread along the side of the first lyophobic layer 18 facing the second substrate 2, which may lead to the display of color in the respective one of the plurality of subpixels SP. For example, the electrowetting fluid 3L is in the fluid channel 3, and is not in the first fluid reservoir 15T.

Figure 4A:
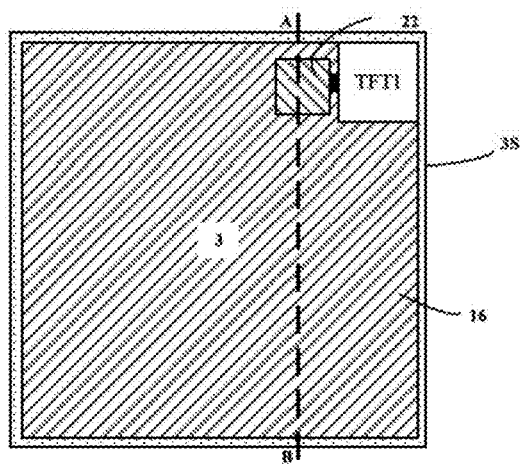
FIG. 4A is a plan view of one of the plurality of subpixels of an electrowetting display panel in a turn-off state in some embodiments according to the present disclosure.

FIG. 4A is a plan view of one of the plurality of subpixels of an electrowetting display panel in a turn-off state in some embodiments according to the present disclosure. Referring to FIG. 4, the electrowetting fluid in at least two of the plurality of subpixels SP has different colors. At least one of the plurality of subpixels are in red color, at least one of the plurality of subpixels are in green color, and at least one of the plurality of subpixels are in blue color. Optionally, subpixels in different color have different fluid channels, and different fluid channels have different electrowetting fluid in different colors. For example, electrowetting fluid in a subpixel with red color of the plurality of subpixels includes red pigment. Electrowetting fluid in a subpixel with green color of the plurality of subpixels includes green pigment. Electrowetting fluid in a subpixel with blue color of the plurality of subpixels includes blue pigment.

FIG. 4 shows a structure of one of the plurality of subpixels of an electrowetting display panel. The first thin film transistor TFT1 is connected to the first electrode layer 16 in a respective one of the plurality of subpixels.

In the turn-off state, TFT1 is turned off. The electrowetting fluid is accumulated in the first fluid reservoir and shielded by the light shielding layer 22. The plan view is viewed along a direction from the second substrate to the first substrate, the second electrode layer and the second lyophobic layer are transparent, the light shielding layer 22 and the sealing elements are observed. For example, in the turn-off state, there is not electrowetting fluid in the fluid channel 3, and the large portion of the electrowetting display panel observed in the plan view is the first electrode layer 16 of the electrowetting display panel.

Optionally, a size of one of the plurality of subpixels is 100×100 µm, and a size of the first electrode layer in the respective one of the plurality of subpixels is 85×85 µm. The effective subpixel area of the respective one of the plurality of subpixels reaches 90%.

Optionally, Vgate can be set as 10V, and Wale can be set as 25V.

Figure 4B:
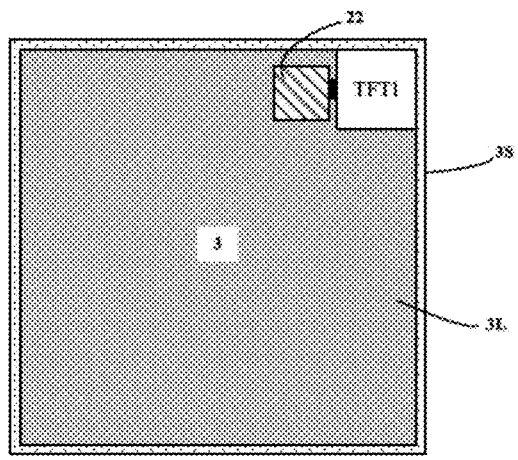
FIG. 4B is a plan view of one of the plurality of subpixels of an electrowetting display panel in a turn-on state in some embodiments according to the present disclosure.

FIG. 4B is a plan view of one of the plurality of subpixels of an electrowetting display panel in a turn-on state in some embodiments according to the present disclosure.

In the turn-on state, TFT1 is turned on. The electrowetting fluid 3L spreads in the fluid channel 3, and there is no electrowetting fluid in the first fluid reservoir. The plan view is viewed along a direction from the second substrate to the first substrate, the large portion of the electrowetting display panel observed in the plan view is electrowetting fluid 3L in the fluid channel 3. The electrowetting fluid 3L covers the first electrode layer 16 observed in the FIG. 4A.

Figure 4C:
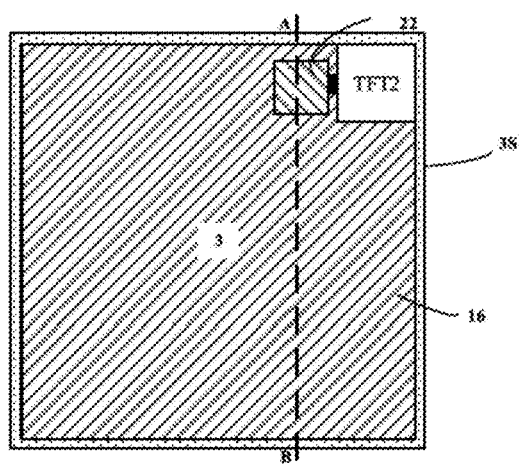
FIG. 4C is a plan view of one of the plurality of subpixels of an electrowetting display panel in a turn-off state in some embodiments according to the present disclosure.

FIG. 4C is a plan view of one of the plurality of subpixels of an electrowetting display panel in a turn-off state in some embodiments according to the present disclosure. The electrowetting display panel further include a second thin film transistor TFT2 connected to the second substrate in each individual one of the plurality of the subpixels.

In the turn-off state, TFT1 and TFT2 are turned off. The electrowetting fluid is accumulated in the first fluid reservoir and shielded by the light shielding layer 22. The plan view is viewed along a direction from the second substrate to the first substrate, the second electrode layer and the second lyophobic layer are transparent, the light shielding layer 22, the second thin film transistor TFT2, and the sealing elements are observed. For example, in the turn-off state, there is not electrowetting fluid in the fluid channel 3, and the large portion of the electrowetting display panel observed in the plan view is the first electrode layer 16 of the electrowetting display panel.

Figure 4D:
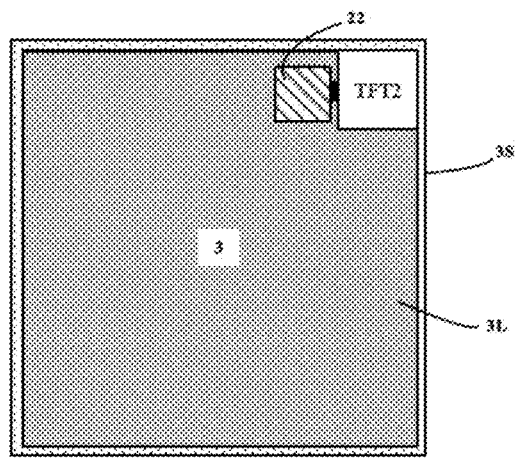
FIG. 4D is a plan view of one of the plurality of subpixels of an electrowetting display panel in a turn-on state in some embodiments according to the present disclosure.

FIG. 4D is a plan view of one of the plurality of subpixels of an electrowetting display panel in a turn-on state in some embodiments according to the present disclosure. The electrowetting display panel further include a second thin film transistor TFT2 connected to the second substrate in each individual one of the plurality of the subpixels.

In the turn-on state, TFT1 or TFT2 is turned on. The electrowetting fluid 3L spreads in the fluid channel 3, and there is no electrowetting fluid 3L, in the first fluid reservoir. The plan view is viewed along a direction from the second substrate to the first substrate, the large portion of the electrowetting display panel observed in the plan view is electrowetting fluid 3L in the fluid channel 3. The electrowetting fluid 3L covers the first electrode layer 16 observed in the FIG. 4A.

In another aspect, the present disclosure also provides a method of driving an electrowetting display panel, in some embodiments, using a method of driving an electrowetting display panel having a subpixel area and an inter-subpixel area, the electrowetting display panel include a plurality of subpixels.

Optionally, the electrowetting display panel includes a first substrate and a second substrate facing each other. Optionally, the first substrate includes a first insulating layer, and a first electrode layer on the first insulating layer; and a first lyophobic layer on a side of the first electrode layer away from the first insulating layer. Optionally, the second substrate includes a second electrode layer, and a second lyophobic .layer on the second electrode layer.

Optionally, the electrowetting display panel in a respective one of the plurality of subpixels includes a fluid channel formed, between the first lyophobic layer and the second lyophobic layer for allowing an electrowetting fluid to move between the first lyophobic layer and the second lyophobic layer. Optionally, a first fluid reservoir is formed in the first substrate in the inter-subpixel area for storing the electrowetting fluid, and in fluid communication with the fluid channel, Optionally, a first thin film transistor is configured to provide a first driving signal to the first electrode layer. Optionally, a second thin film transistor configured to provides a second driving signal to the second electrode layer.

FIG. 5A is a flow chat illustrating a method of driving an electrowetting display panel in some embodiments according to the present disclosure. Referring to FIG. 5A, a method of driving an electrowetting display panel includes turning off the first thin film transistor to allow the electrowetting fluid to withdraw into the first fluid reservoir, and turning on the first thin film transistor to drive the electrowetting fluid into the fluid channel.

During the process of turning off the first thin film transistor to allow the electrowetting fluid to withdraw into the first fluid reservoir, the corresponding cross-sectional view of this process is FIG. 3A, and the corresponding plan view of this process is FIG. 4A.

During the process of turning on the first thin film transistor to drive the electrowetting fluid into the fluid channel, the corresponding cross-sectional view of this process is FIG. 3B, and the corresponding plan view of this process is FIG. 4B.

FIG. 5B is a flow chat illustrating a method of driving an electrowetting display panel in some embodiments according to the present disclosure. Referring to FIG. 5B, a method of driving an electrowetting display panel includes turning off both the first thin film transistor and the second thin film transistor to allow the electrowetting fluid to withdraw into the first fluid reservoir, and turning on one or a combination of the first thin film transistor and the second thin film transistor to drive the electrowetting fluid into the fluid channel.

During the process of turning off both the first thin film transistor and the second thin film transistor to allow the electrowetting fluid to withdraw into the first fluid reservoir, the corresponding cross-sectional view of this process is FIG. 3C, and the corresponding plan view of this process is FIG. 4C.

During the process of turning on one or a combination of the first thin film transistor and the second thin film transistor to drive the electrowetting fluid into the fluid channel, the corresponding cross-sectional view of this process is FIG. 3D, and the corresponding plan view of this process is FIG. 4D.

In another aspect, the present disclosure also provide a structure of an electrowetting display panel. FIG. 6A is a cross-sectional view of a first substrate in some embodiments according to the present disclosure. Referring to FIG. 2A and FIG. 6A, a distance between the first via 15H and the first fluid reservoir 15T in FIG. 2A is greater than a distance between the first via 15H and the first fluid reservoir 15T in FIG. 6A. For example, in FIG. 2A, the first via 15H and the first fluid reservoir 15T are respectively on two sides of the respective one of the plurality of subpixels (with respect to a center of the respective one of the plurality of subpixels). In FIG. 6A, the first via 15H and the first fluid reservoir 15T are on a same side of the respective one of the plurality of subpixels (with respect to a center of the respective one of the plurality of subpixels).

Figure 6B:
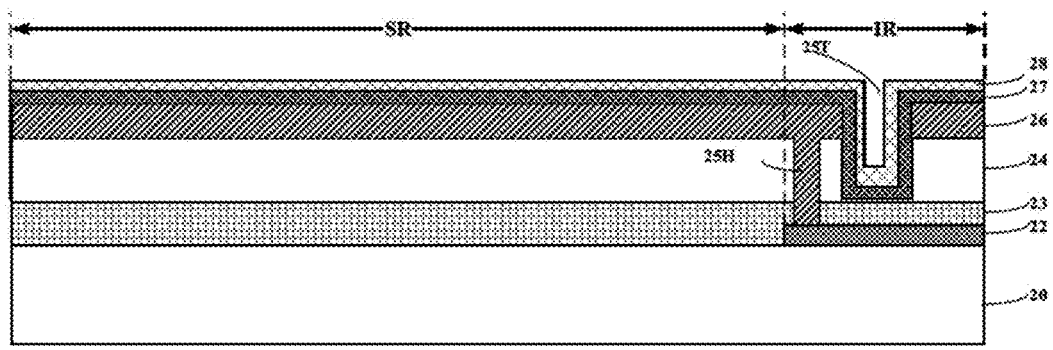
FIG. 6B is a cross-sectional view of a second substrate in some embodiments according to the present disclosure.

FIG. 6B is a cross-sectional view of a second substrate in some embodiments according to the present disclosure. Referring to FIG. 6B, in some embodiments, in the second substrate, each individual one of the plurality of subpixels includes a second base substrate 20, a light shielding layer 22 on a side of the second base substrate 20, a second buffer layer 23, a second insulating layer 24, a second electrode layer 26, a second dielectric layer 27, and a second lyophobic layer 28, In some embodiments, the second insulating layer 24 on a side of the second electrode layer 26 away from the second lyophobic layer 28. In one example, the second insulating layer 24 is made of insulating materials, e.g. resin.

In some embodiments, the second electrode layer 26 is on a side of the second insulating layer 24 away from the second base substrate 20. Optionally, the second electrode layer 26 is connected to a second thin film transistor in a respective one of the plurality of subpixels. Option ally, the second electrode layer 26 is a transparent electrode layer.

Various appropriate materials may be used for making the second electrode layer 26. Examples of materials appropriate for making the second electrode layer 26 include, but not limited to, transparent materials. For example, the second electrode layer 26 is made of indium tin oxide (ITO).

In some embodiments, each individual one of the plurality of subpixels includes a second fluid reservoir 25T formed in the second substrate in the inter-subpixel area for storing the electrowetting fluid, and in fluid communication with the fluid channel.

Optionally, in each individual one of the plurality of subpixels, the second fluid reservoir 25T extends through the second electrode layer 26 and extends into the second insulating layer 24. Optionally, an area where the second fluid reservoir 25T extends through in the second insulating layer 24 corresponds to the inter-subpixel area IR In one example, the area where the second fluid reservoir 25T extends through in the second insulating layer 24 is on an end of the second insulating layer 24. In another example, the area where the second fluid reservoir 25T extends through in the second insulating layer 24 is in the middle of the second insulating layer 24. Optionally, the area where the second fluid reservoir 25T extends through in the second insulating layer 24 corresponds to the subpixel area.

Optionally, various appropriate shapes may be used to form the cross-sectional view of the second fluid reservoir 25T. The suitable shapes include, but not limited to, rectangular.

Optionally, the second fluid reservoir 25T extends, into the second substrate by a depth in a range of approximately 40 µm to approximately 80 µm, e.g. approximately 40 µm to approximately 50 µm, approximately 50 µm to approximately 60 µm, approximately 60 µm to approximately 70 µm, and approximately 70 µm to approximately 80 µm. Optionally, the second fluid reservoir 25T has a lateral width in a range of approximately 15 µm to approximately 30 µm, e.g., approximately 15 µm to approximately 20 µm, approximately 20 µm to approximately 25 µm, and approximately 25 µm to approximately 30 µm. Optionally, the thickness of the second insulating layer 24 is no less than the depth of the second fluid reservoir 25T. For example, the thickness of the second insulating layer 24 equals to the depth of the second fluid reservoir 25T.

In some embodiments, the second dielectric layer 27 is disposed between the second electrode layer 26 and the second lyophobic layer 28. And an orthographic projection of the second dielectric layer 27 on the second base substrate 20 is covered by an orthographic projection of the second lyophobic layer 28 on the second base substrate 20. Optionally, the orthographic projection of the second dielectric layer 27 on the second base substrate 20 covers the second fluid reservoir 25T. For example, the second dielectric layer 27 is present in a region outside the second fluid reservoir 25T and is also present in a region inside the second fluid reservoir 25T. The second dielectric layer 27 extends from the region outside the second fluid reservoir 25T into the region inside the second fluid reservoir 25T. Optionally, the second dielectric layer 27 covers the lateral walls and the bottom wall of the second fluid reservoir 25T. In one example, the orthographic projection of the second electrode layer 26 on the second base substrate 20 does not cover the second fluid reservoir 25T, For example, the second electrode layer 26 is present in a region outside the second fluid reservoir 25T and is absent in a region inside the second fluid reservoir 25T. Optionally, a portion of the second dielectric layer 27 in the region outside the first fluid reservoir 15T is disposed between the second electrode layer 26 and the second lyophobic layer 28. Optionally, a portion of the second dielectric layer 27 in the region inside the second fluid reservoir 25T is disposed between the second fluid reservoir 25T and the second insulating layer 24, e.g., between the second lyophobic layer 28 and the second insulating layer 24, Optionally, the second dielectric layer 27 is made of $SiO_2$. Optionally, the thickness of the second dielectric layer 27 is approximately 0.25 µm. Optionally, the second dielectric layer 27 may prevent currents from flowing through the electrowetting fluid, which allows the electrowetting display panel to work under a relatively high voltage.

In some embodiments, the second lyophobic layer 28 is on a side of the second dielectric layer 27 away from the second base substrate 20. Optionally, the second lyophobic layer 28 is on a side of the second dielectric layer 27 away from the second insulating layer 24. Optionally, an orthographic projection of the second lyophobic layer 28 on the second base substrate 20 covers the second fluid reservoir 25T. Optionally, the orthographic projection of the second lyophobic layer 28 on the second base substrate 20 overlaps with the orthographic projection of the second electrode layer 26 on the second base substrate 20. For example, the second lyophobic layer 28 is present in a region outside the second fluid reservoir 25T, and is also present in a region inside the second fluid reservoir 25T. The second lyophobic layer 28 extends from the region outside the second fluid reservoir 25T into the region inside the second fluid reservoir 25T. Optionally, the second lyophobic layer 28 covers the lateral walls and the bottom wall of the second fluid reservoir 25T. Optionally, there is no affinity between the second lyophobic layer 28 and the electrowetting fluid, and the second lyophobic layer 28 repels the electrowetting fluid. Optionally, the second lyophobic layer is a transparent lyophobic layer. For example, the second lyophobic layer 28 include fluorinated transparent materials. Optionally, the second lyophobic layer 28 is relatively thin, for example, the thickness of the second lyophobic layer 28 is approximately 100 nm.

In some embodiments, a second buffer layer 23 is on a side of the second insulating layer 24 facing the second base substrate 20. Optionally, the second buffer layer 23 is used for flattening a side of the second insulating layer 24 facing the second base substrate 20. Optionally, the first buffer layer 13 is made of $SiN_x$.

In some embodiments, each individual one of the plurality of subpixels includes a second via 25H extending through the second insulating layer 24. Optionally, the second via 25H extends through the second insulating layer 24 and the second buffer layer 23.

In some embodiments, the light shielding layer 22 is on a side of the second buffer layer 23 away from the second electrode layer 26. Optionally, the second electrode layer 26 is connected to the light shielding layer 22 through the second via 25H. Optionally, the light shielding layer 22 is in direct contact with the second buffer layer 23.

In some embodiments, the location of the light shielding layer 22 corresponds to the location of the second fluid reservoir 25T in a respective one of the plurality of subpixels. Optionally, an orthographic projection of the light shielding layer 22 on the second lyophobic layer 28 covers the second fluid reservoir 25T, and is substantially outside a region corresponding to the fluid channel. Optionally, the light shielding layer 22 blocks light transmitting through the electrowetting fluid in the second fluid reservoir 25T, but the light shielding layer 22 does not block light transmitting through the electrowetting fluid in the region of fluid channel corresponding to the subpixel area in a respective one of the plurality of subpixels.

Optionally, the light shielding layer 22 is made of carbon. Optionally, the light shielding layer 22 includes conductive materials, for example, conductive materials include, but not limited to, Al—Mo alloy. Optionally, the light shielding layer 22 and the second electrode layer 26 connects to each other in parallel to decrease the resistance in the circuit.

Optionally, the materials filled in the second via 25H to connect the light shielding layer 22 and the second electrode layer 26 can be the same as the materials used for making the second electrode layer 26, e.g. ITO. The fabricating process is simplified by using the same material both to make the second electrode layer 26 and to till the second via 25H.

In some embodiments, the first substrate (e.g., the one shown in FIG. 6A) and the second substrate (e.g., the one shown in FIG. 6B) can be fabricated so that corresponding layers of the first substrate and the second substrate can be made of a substantially the same material and made to have a substantially the same structure, except that the first electrode layer 16 and the second electrode layer 26 are made of different material and except for the light shielding layer 22.

In each individual one of the plurality of subpixels, in one example, the first fluid reservoir 15T and the second fluid reservoir 25T are disposed in positions corresponding to each other. In another example, the shapes of the first fluid reservoir 15T and the second fluid reservoir 25T are the same.

In each individual one of the plurality of subpixels, in one example, the first insulating layer 14 and the second insulating layer 24 are made of same material. In another example, the first lyophobic layer 18 and the second lyophobic layer 28 are made of same material. In another example, the conductive layer 12 and the light shielding layer 22 are made of same material. In another example, the first buffer layer 13 and the second buffer layer 23 are made of same material. In another example, the first dielectric layer 17 and the second dielectric layer 27 are made of same material. Using same material may simplify the fabricating process, lower the cost, and increase the production capacity.

Figure 7:
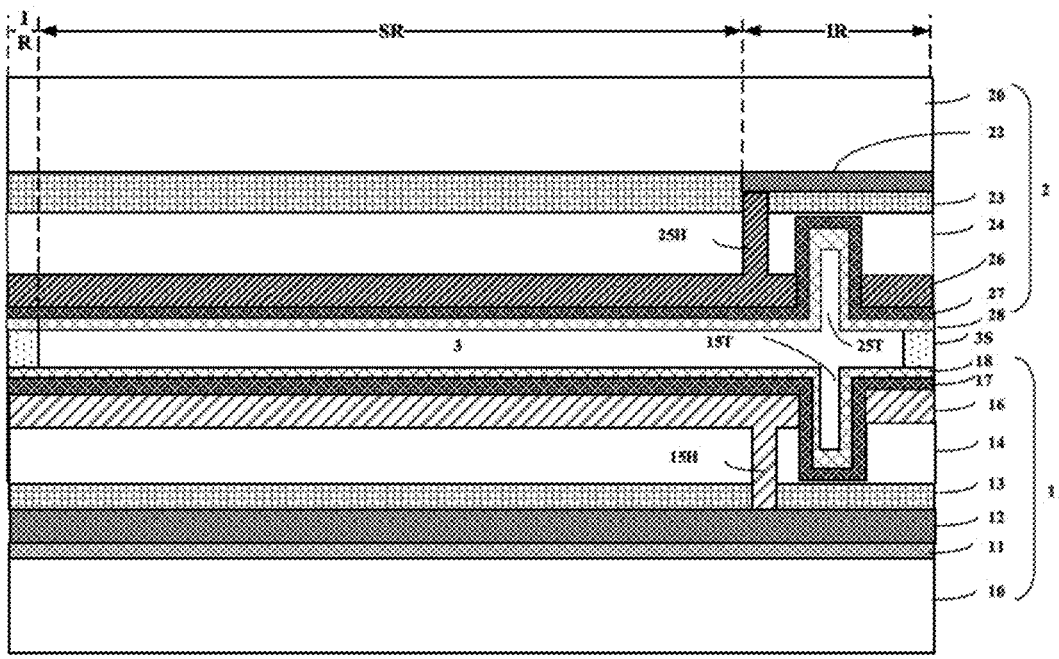
FIG. 7 is a cross-sectional view of an electrowetting display panel in some embodiments according to the present disclosure.

FIG. 7 is a cross-sectional view of an electrowetting display panel in some embodiments according to the present &closure. FIG. 7 shows a cross-sectional view of an electrowetting display panel formed by the first substrate 1 in the FIG. 6A and the second substrate 2 in the FIG. 6B. Referring to FIG. 7, in some embodiments, the first substrate 1 and the second substrate 2 are assembled together into a cell. A fluid channel 3 is formed between the first substrate 1 and the second substrate 2.

Specifically, the fluid channel 3 is formed between first lyophobic layer 18 and the second lyophobic layer 28 for allowing an electrowetting fluid to move between the first lyophobic layer 18 and the second lyophobic layer 28. Optionally, the first fluid reservoir 15T is connected to the fluid channel 3, and the second fluid reservoir 25T is also connected to the fluid channel 3. The first fluid reservoir 15T, the second fluid reservoir 25T, and the fluid channel 3 are in communication. Optionally, the fluid channel 3 is defined and sealed by the sealing elements 3S to avoid color mixture between adjacent subpixels of the plurality of subpixels.

Optionally, the first fluid reservoir 15T and the second fluid reservoir 25T are disposed on two opposite sides of a respective one of the plurality of subpixels in a substantially symmetrical fashion with respect to the fluid channel 3. And the light shielding layer 22 can also be used as a layer with low resistance, e.g. conductive layer.

In some embodiments, two fluid reservoirs (the first fluid reservoir 15T and the second fluid reservoir 25T) are adopted to increase the display area in each individual one of the plurality of subpixels and decrease the thickness of the electrowetting display panel. Also, the two fluid reservoirs can increase the Pixels Per Inch PPI.

In one example, the thickness of the electrowetting display panel is fixed, and the volume of electrowetting liquid used in each individual one of the plurality of subpixels is fixed. Comparing an electrowetting display panel with double fluid reservoirs to an electrowetting display panel with single reservoir, the volume of the electrowetting fluid stored in a respective one of the fluid reservoir in the electrowetting display panel with double fluid reservoirs is half of the volume of the electrowetting fluid stored in a fluid reservoir in the electrowetting display panel with single reservoir. When a cross-sectional area of the fluid reservoir along a plane parallel to the base substrate is fixed, the thickness of the insulating layer corresponding to a respective one of the fluid reservoirs in the electrowetting display panel with double fluid reservoirs is half of the thickness of the insulating layer corresponding to the fluid reservoir in the electrowetting display panel with single reservoir, Optionally, when the depth of each fluid reservoir in the electrowetting display panel with double fluid reservoirs is increased, the cross-sectional area of the fluid reservoir along a plane parallel to the base substrate can be decreased, and the inter-subpixel area in each individual one of the plurality of subpixels can be decreased. In one example, the display area of each individual one of the plurality of subpixels can be increased without increasing the size of each individual one of the plurality of subpixels. In another example, the display area of each individual one of the plurality of subpixels is fixed, the size of each individual one of the plurality of subpixels can be increased, and the Pixels Per Inch PPI can be increased.

Figure 8:
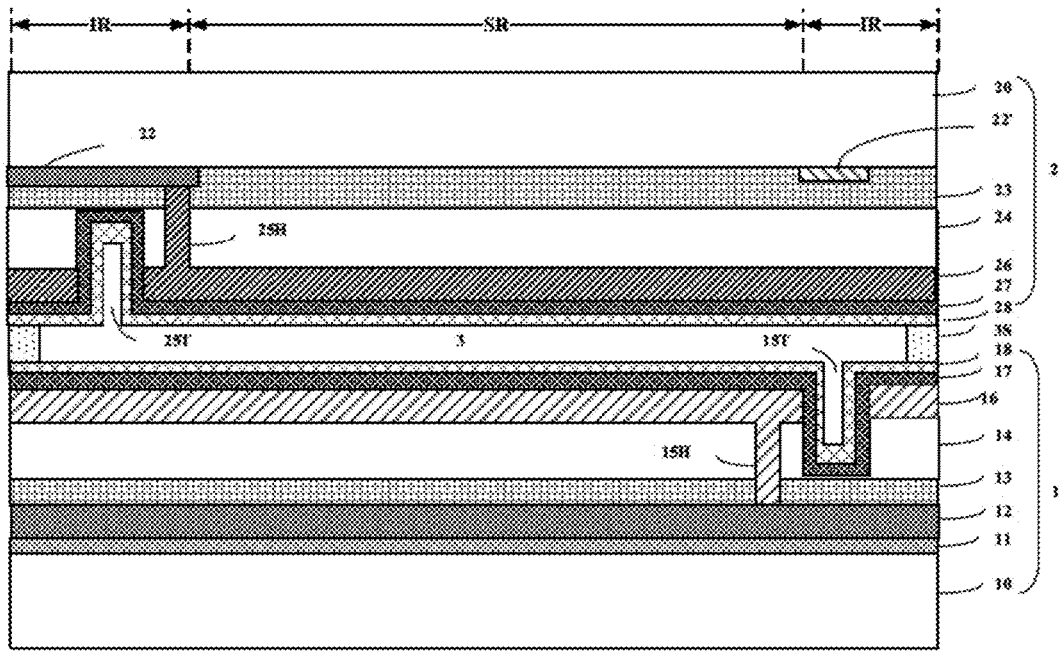
FIG. 8 is a cross-sectional view of an electrowetting display panel in some embodiments according to the present disclosure.

FIG. 8 is a cross-sectional view of an electrowetting display panel in some embodiments according to the present disclosure. FIG. 8 shows a cross-sectional view of an electrowetting display panel formed by the first substrate 1 in the FIG. 6A and the second substrate 2 in the FIG. 6B. Referring to FIG. 8, in some embodiments, the first substrate 1 and the second substrate 2 are assembled together into a cell. Optionally, the first fluid reservoir 15T and the second fluid reservoir 25T are disposed in a substantially asymmetrical fashion with respect to the fluid channel 3. Optionally, a second light shielding layer 22' is disposed on a side of the second buffer layer 23 facing the second base substrate 20. And second light shielding layer 22' corresponds to the first fluid reservoir 15T in the first substrate 1. For example, an orthographic projection of the second light shielding layer 22' on the first based substrate 10 covers the first fluid reservoir 15T.

Figure 9A:
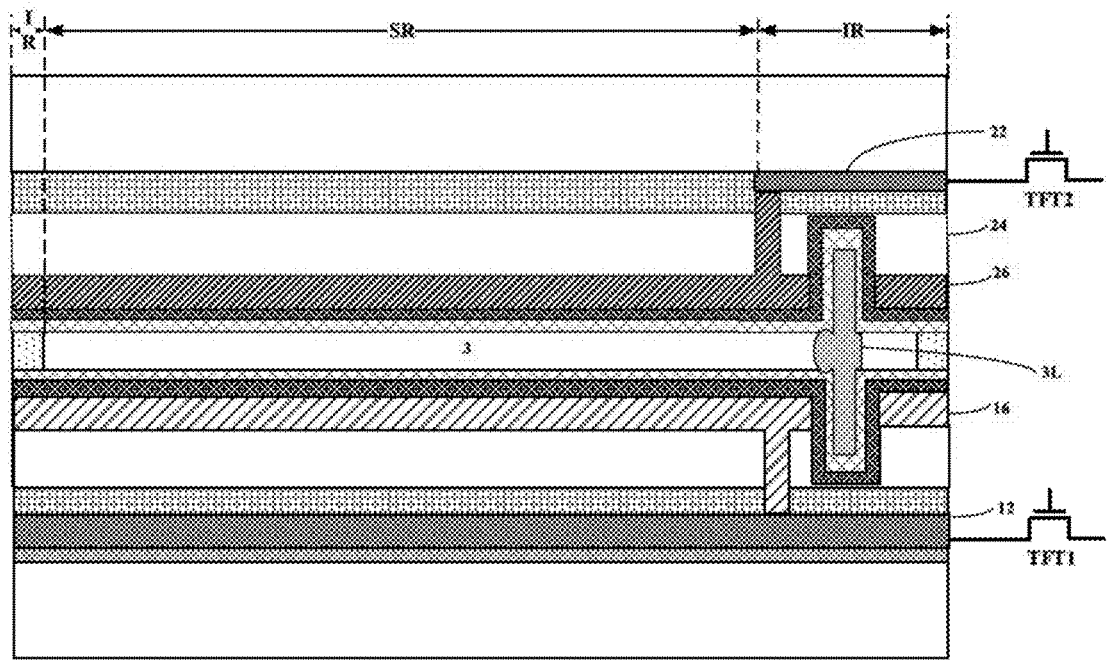
FIG. 9A is a cross-sectional view of an electrowetting display panel in a turn-off state in some embodiments according to the present disclosure.

FIG. 9A is a cross-sectional view of an electrowetting display panel in a turn-off state in some embodiments according to the present disclosure. Referring to FIG. 9A, each individual one of the plurality of subpixels includes a first thin film transistor TFT1 and a second thin film transistor TFT2. The first thin film transistor TFT1 is configured to provide a first driving signal V1 to the first electrode layer 16. The second thin film transistor TFT2 is configured to provide a second driving signal V2 to the second electrode layer 26. Optionally, the first substrate 1 and the second substrate 2 are assembled together into a cell, as shown in FIG. 7 or FIG. 8. Optionally, the electrowetting fluid 3L is in one or a combination of the fluid channel 3, the first fluid reservoir 15T, and the second fluid reservoir 25T.

In some embodiments, the first thin film transistor TFT1 and the second thin film transistor TFT2 can independently address a respective one of the plurality of subpixels, Optionally, the first thin film transistor TFT1 is connected to the first electrode layer 21. Specifically, the conductive layer 12 connects the first thin film transistor TFT1 to the first electrode layer 16 in the respective one of the plurality of subpixels. For example, the first thin film transistor TFT1 can independently provide the first driving signal V1 to the first electrode layer 16. Optionally, the second thin film transistor TFT2 is connected to the second electrode layer 26, Specifically, the light shielding layer 22 connects the second thin film transistor TFT2 to the second electrode layer 26 in the respective one of the plurality of subpixels. For example, the second thin film transistor TFT2 can independently provide the second driving signal V1 to the second electrode layer 26.

In the turn-off state, the first thin film transistor TFT1 and the second thin film transistor TFT2 are turned off Referring to FIG. 9A, the electrowetting fluid 3L is held into the first fluid reservoir 15T and the second fluid reservoir 25T by the surface tension of the electrowetting fluid 3L. No electrowetting fluid 3L spreads into the fluid channel 3. At the same time, the orthographic projection of the light shielding layer 22 on the first substrate 1 covers the first fluid reservoir 15T and the second fluid reservoir 25T, For example, the light transmitting though the first fluid reservoir 15T and the light transmitting through the second fluid reservoir 25T is blocked by the light shielding layer 22. No color is displayed by the respective one of the plurality of subpixels.

Figures 9B, 10:
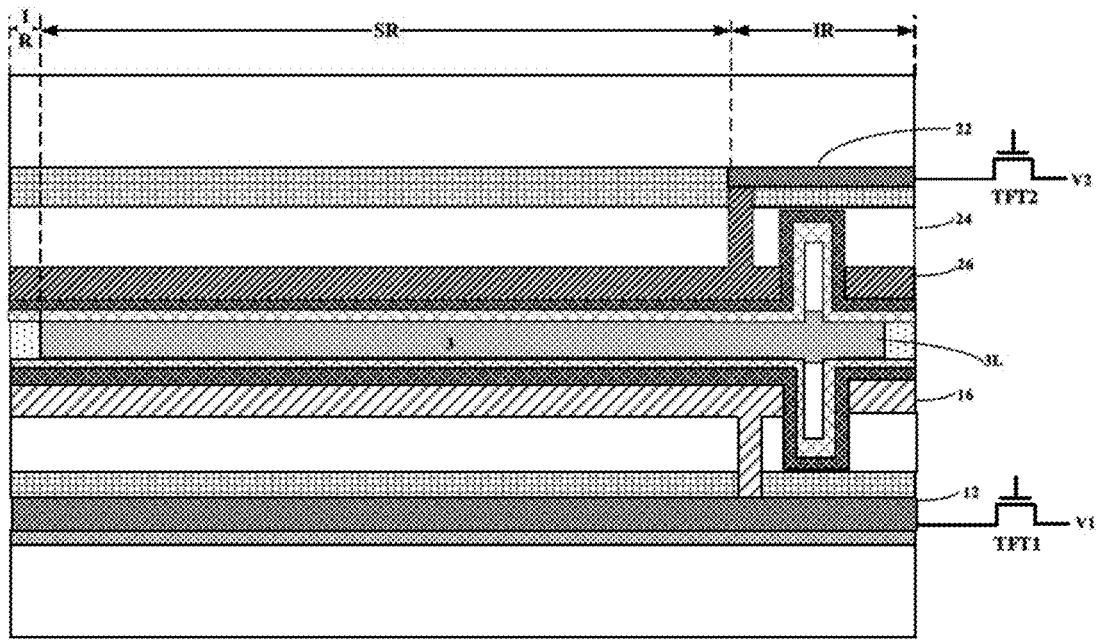
FIG. 9B is a cross-sectional view of an electrowetting display panel in a turn-on state in some embodiments according to the present disclosure.
FIG. 10 is a flow chat illustrating a method of driving an electrowetting display panel in some embodiments according to the present disclosure.

FIG. 9B is a cross-sectional view of an electrowetting display panel in a turn-on state in some embodiments according to the present disclosure. Referring to FIG. 9B, one or a combination of the first thin film transistor TFT1 and the second thin film transistor TFT2 are turned on. The electrowetting fluid 3L is driven into the fluid channel 3 from one or a combination of the first fluid reservoir 15T and the second fluid reservoir 25T.

Optionally, both the first thin film transistor TFT1 and the second thin film transistor TFT2 are turned on to provide the first driving signal V1 to the first electrode layer 16, and provide the second driving signal V2 to the second electrode layer 26 in a respective one of the plurality of subpixels. The electrowetting fluid 3L is driven into the fluid channel 3 from both the first fluid reservoir 15T and the second fluid reservoir 25T in the respective one of the plurality of subpixels. And no electrowetting fluid 3L is in either the first fluid reservoir 15T and the second fluid reservoir 25T.

Optionally, one of the first thin film transistor TFT1 and the second thin film transistor TFT2 is turned on to control grey scale of a respective one of the plurality of subpixels. in one example, the first thin film transistor TFT1 is turned on, the electrowetting fluid 3L in the first fluid reservoir 15T is driven into the fluid channel 3 in the respective one of the plurality of subpixels, but the electrowetting fluid 3L in the second fluid reservoir 25T is held in the second fluid reservoir 25T. In another example, the second thin film transistor TFT2 is turned on, the electrowetting fluid 3L in the second fluid reservoir 25T is driven into the fluid channel 3 in the respective one of the plurality of subpixels, but the electrowetting fluid 3L in the first fluid reservoir 15T is held in the second fluid reservoir 25T.

Referring to FIG. 8, when the first fluid reservoir 15T and the second fluid reservoir 25T are disposed in a substantially asymmetrical fashion with respect to the fluid channel 3, the electrowetting fluid 3L from the first fluid reservoir 15T and the electrowetting fluid 3L from the second fluid reservoir 25T is driven into the fluid channel 3 in two opposite directions, which may enhance the response speed of the respective one of the plurality of subpixels.

In another aspect, the present disclosure also provides a method of driving an electrowetting display panel. In some embodiments, using a method of driving an electrowetting display panel having a subpixel area and an inter-subpixel area, the electrowetting display panel include a plurality of subpixels.

Optionally, the electrowetting display panel includes a first substrate and a second substrate facing each other. Optionally, the first substrate includes a first insulating layer, and a first electrode layer on the first insulating layer; and a first lyophobic layer on a side of the first electrode layer away from the first insulating layer. Optionally, the second substrate includes a second insulating layer, a second electrode layer, and a second lyophobic layer on the second electrode layer.

Optionally, the electrowetting display panel in a respective one of the plurality of subpixels includes a fluid channel formed between the first lyophobic layer and the second lyophobic layer for allowing an electrowetting fluid to move between the first lyophobic layer and the second lyophobic layer. Optionally, a first fluid reservoir is thrilled in the first substrate in the inter-subpixel area for storing the electrowetting fluid, and in fluid communication with the fluid channel. Optionally, a second fluid reservoir is formed in the second substrate in the inter-subpixel area fir storing the electrowetting fluid, and in fluid communication with the fluid channel. Optionally, a first thin film transistor is configured to provide a first driving signal to the first electrode layer. Optionally, a second thin film transistor configured to provides a second driving signal to the second electrode layer.

FIG. 10 is a flow chat illustrating a method of driving an electrowetting display panel in some embodiments according to the present disclosure. Referring to FIG. 10, a method of driving, an electrowetting display panel includes turning off both the first thin film transistor and the second thin film transistor to allow the electrowetting fluid to withdraw into the first fluid reservoir and the second fluid reservoir, and turning on one or a combination of the first thin film transistor and the second thin film transistor to drive the electrowetting fluid into the fluid channel.

In the turn-off state, both the first thin film transistor and the second thin film transistor are turned off, as shown in FIG. 9A.

In the turn-on state, in one example, both the first thin film transistor and the second thin film transistor are turned on, as shown in FIG. 9B. In another example, only one of the first thin film transistor and the second thin film transistor is turned on to display grey scale image.

In another aspect, the present disclosure also provide a display apparatus including the electrowetting display panel described herein, and one or more integrated circuits connected to the electrowetting display panel. Examples of appropriate display apparatuses include, but are not limited to, an electronic paper, a mobile phone, a tablet computer, a television, a monitor, a notebook computer, a digital album, a GPS, etc.

In another aspect, the present disclosure also provide a method of fabricating an electrowetting display panel having a subpixel area and an inter-subpixel area, and including a plurality of subpixels.

In some embodiments, the method includes forming a first substrate; forming a second substrate; and assembling the first substrate and the second substrate together. Optionally, forming the first substrate includes thrilling a first insulating layer; forming a first electrode layer on the first insulating layer; and forming a first lyophobic layer on a side of the first electrode layer away from the first insulating layer. Optionally, forming the second substrate includes forming a second electrode layer; and forming a second lyophobic layer on the second electrode layer.

In some embodiments, the method further includes, in a respective one of the plurality of subpixels, forming a fluid channel between the first lyophobic layer and the second lyophobic layer for allowing an electrowetting fluid to move between the first lyophobic layer and the second lyophobic layer; forming a first fluid reservoir in the first substrate in the inter-subpixel area for storing the electrowetting fluid, and in fluid communication with the fluid channel; forming a first thin film transistor configured to provide a first driving signal to the first electrode layer; and forming a second thin film transistor configured to provides a second driving signal to the second electrode layer.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An electrowetting display panel comprising a plurality of subpixels, each of the plurality of subpixels having a subpixel area and an inter-subpixel area, wherein the electrowetting display panel comprises:
    a first substrate, comprising a first insulating layer, a first electrode layer on the first insulating layer, and a first lyophobic layer on a side of the first electrode layer away from the first insulating layer;
    a second substrate facing the first substrate, comprising a second electrode layer, and a second lyophobic layer on the second electrode layer; and
    a plurality of sealing elements between the first substrate and the second substrate to define a plurality of fluid channels, each of the plurality of sealing elements being in the inter-subpixel area;
    wherein the electrowetting display panel in a respective one of the plurality of subpixels comprises:
    a first fluid reservoir in the first substrate and in the inter-subpixel area for storing an electrowetting fluid; and
    a respective one of the plurality of fluid channels between the first lyophobic layer and the second lyophobic layer connecting with the first fluid reservoir;
    wherein the second substrate further comprises:
    a light shielding layer in the inter-subpixel area;
    a second insulating layer on a side of the second electrode layer away from the second lyophobic layer; and
    a second via extending through the second insulating layer;
    wherein an orthographic projection of the light shielding layer on the first substrate covers the first fluid reservoir; and
    the second electrode layer is connected to the light shielding layer through the second via.

2. The electrowetting display panel of claim 1, wherein the electrowetting display panel in the respective one of the plurality of subpixels further comprises:
    a first thin film transistor configured to provide a first driving signal to the first electrode layer; and
    a second thin film transistor configured to provide a second driving signal to the second electrode layer.

3. The electrowetting display panel of claim 1, wherein the first substrate further comprises:
    a first via extending through the first insulating layer; and
    a conductive layer on a side of the first insulating layer away from the first electrode layer, being connected to the first electrode layer through the first via.

4. The electrowetting display panel of claim 3, wherein the first substrate further comprises a first buffer layer between the conductive layer and the first insulating layer; and
    the first via extends through the first insulating layer and the first buffer layer.

5. The electrowetting display panel of claim 1, wherein the light shielding layer connects a second thin film transistor to the second electrode layer in the respective one of the plurality of subpixels.

6. The electrowetting display panel of claim 1, wherein the light shielding layer is in direct contact with the second electrode layer.

7. The electrowetting display panel of claim 1, wherein the electrowetting display panel in the respective one of the plurality of subpixels comprises a second fluid reservoir in the second substrate and in the inter-subpixel area for storing the electrowetting fluid, and in fluid communication with the respective one of the plurality of fluid channels.

8. The electrowetting display panel of claim 7, wherein the first fluid reservoir and the second fluid reservoir are disposed on two opposite sides of the respective one of the plurality of subpixels in a substantially symmetrical fashion with respect to the respective one of the plurality of fluid channels.

9. The electrowetting display panel of claim 7, wherein the first fluid reservoir and the second fluid reservoir are disposed in a substantially asymmetrical fashion with respect to the respective one of the plurality of fluid channels.

10. The electrowetting display panel of claim 1, wherein the second substrate further comprises a second buffer layer on a side of the second insulating layer away from the second electrode layer; and
the second via extends through the second insulating layer and the second buffer layer.

11. The electrowetting display panel of claim 10, wherein the light shielding layer is in direct contact with the second buffer layer.

12. The electrowetting display panel of claim 1, further comprising an electrowetting fluid in one or a combination of the respective one of the plurality of fluid channels and the first fluid reservoir;
wherein the electrowetting fluid in at least two of the plurality of subpixels has different colors.

13. The electrowetting display panel of claim 1, wherein the first fluid reservoir extends into the first substrate by a depth in a range of approximately 40 µm to approximately 80 µm, and has a lateral width in a range of approximately 15 µm to approximately 30 µm.

14. The electrowetting display panel of claim 1, wherein the first lyophobic layer covers the first electrode layer; and
the second lyophobic layer covers the second electrode layer.

15. The electrowetting display panel of claim 1, wherein the first substrate further comprises a first dielectric layer between the first electrode layer and the first lyophobic layer, and is covered by the first lyophobic layer; and
the second substrate further comprises a second dielectric layer between the second electrode layer and the second lyophobic layer, and is covered by the second lyophobic layer.

16. The electrowetting display panel of claim 1, wherein the second electrode layer is a transparent electrode layer; and
the second lyophobic layer is a transparent lyophobic layer.

17. An electrowetting display apparatus, comprising the electrowetting display panel of claim 1, and one or more integrated circuits connected to the electrowetting display panel.

18. A method of fabricating an electrowetting display panel comprising a plurality of subpixels, each of the plurality of subpixels having a subpixel area and an inter-subpixel area, wherein the method comprises:
forming a first substrate comprising a first insulating layer, a first electrode layer on the first insulating layer, a first lyophobic layer on a side of the first electrode layer away from the first insulating layer, and a first fluid reservoir in the first substrate and in the inter-subpixel area for storing an electrowetting fluid in a respective one of the plurality of subpixels;
forming a second substrate facing the first substrate, comprising a second electrode layer, and a second lyophobic layer on the second electrode layer;
forming a plurality of sealing elements between the first substrate and the second substrate to define a plurality of fluid channels, each of the plurality of sealing elements being in the inter-subpixel area; and
assembling the first substrate and the second substrate together thereby forming a respective one of the plurality of fluid channels between the first lyophobic layer and the second lyophobic layer connecting with the first fluid reservoir;
wherein the electrowetting display panel in the respective one of the plurality of subpixels comprises:
a first fluid reservoir in the first substrate and in the inter-subpixel area for storing the electrowetting fluid; and
a respective one of the plurality of fluid channels between the first lyophobic layer and the second lyophobic layer connecting with the first fluid reservoir
wherein the second substrate further comprises:
a light shielding layer in the inter-subpixel area;
a second insulating layer on a side of the second electrode layer away from the second lyophobic layer; and
a second via extending through the second insulating layer;
wherein an orthographic projection of the light shielding layer on the first substrate covers the first fluid reservoir; and
the second electrode layer is connected to the light shielding layer through the second via.

* * * * *